INVENTOR.
WILBUR O. TEETERS
BY
ATTORNEY

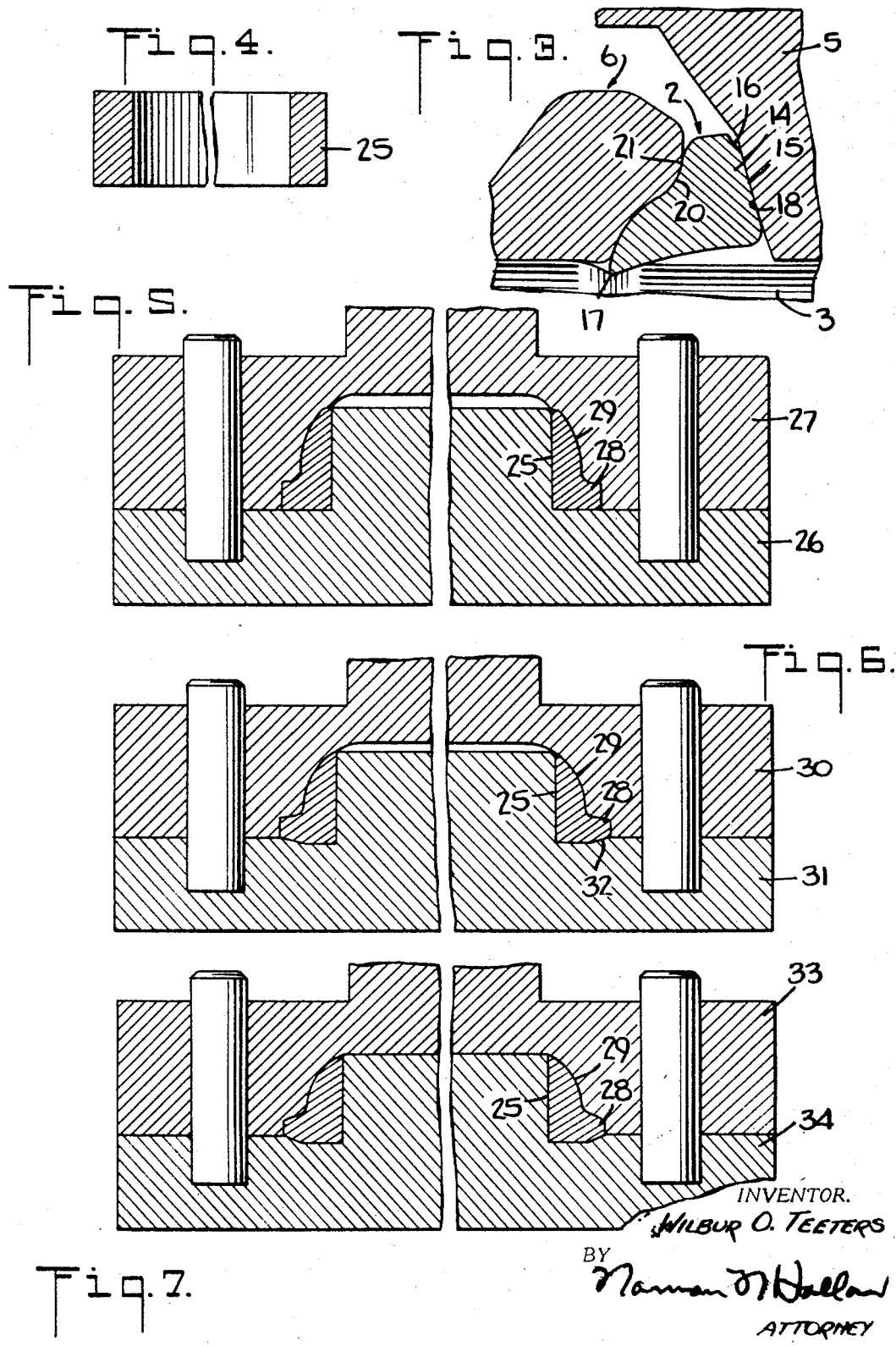

United States Patent Office 3,445,128
Patented May 20, 1969

3,445,128
TUBE COUPLING HAVING DUAL FERRULE GRIPPING ELEMENTS WITH STOP MEANS
Wilbur O. Teeters, Norwood, N.J., assignor to Hoke Manufacturing Company, Inc., Cresskill, N.J., a corporation of New Jersey
Division of application Ser. No. 486,635, Sept. 13, 1965. Continuation-in-part of application Ser. No. 188,023, Apr. 17, 1962. This application Apr. 10, 1967, Ser. No. 647,263
Int. Cl. F16j 19/00, 3/04, 19/08
U.S. Cl. 285—341                                    4 Claims

ABSTRACT OF THE DISCLOSURE

A compression coupling for attaching an unthreaded end of a hollow tube to a fitting using a pair of ring-like ferrules and a compression nut. The fitting has a conical bore adjacent a tube seat and the first or front ferrule and the second or rear ferrule coact with the conical bore and with each other to couple the tube to the fitting and to form a fluid tight seal between the tube and the fitting. The rear ferrule is shaped to move against a stop on the front ferrule to limit its depths of penetration into the tube and preferably the outer surfaces of the rear ferrule are work-hardened.

---

The present invention relates to a compression pipe fitting or a coupling and more particularly to an improved compression coupling combining increased strength with reduced setting torque and high corrosion resistance. This coupling is an improvement over the coupling described in my copending application Ser. No. 188,023, filed Apr. 17, 1962, now Patent No. 3,215,457, dated Nov. 2, 1965 and this application is a division of application Ser. No. 486,635, filed Sept. 13, 1965, now Patent No. 3,321,947 and is a continuation-in-part of application Ser. No. 188,023 now Patent No. 3,215,457.

A pipe coupling is disclosed in the above application in which a pair of ring-like ferrules are compressed by a coupling nut into a flared fitting for providing a pipe coupling action. In this coupling action, a rolling or gyrating action of the rear ferrule is an important feature of the coupling operation. The present invention provides an improved rear ferrule. The rear ferrule has its front outer surface formed with a convex shape in cross section to slide or roll against a complementary concave section on the front ferrule and includes a concave stop surface above the convex surface which strikes a cooperating convex stop surface on the front ferrule to terminate the sliding or rolling action of the rear ferrule to thus control the movement of the rear ferrule against the tube. A preferred form of the rear ferrule has its forward point and the concave sliding surface and the stop surface work-hardened to improve the sliding and controlled penetration portions of the rear ferrule relatively softer for deformation as necessary.

Accordingly, an object of the present invention is to provide an improved compression pipe coupling.

Another object of the present invention is to provide a pipe coupling having an improved pipe penetration control.

Another object of the present invention is to provide an improved pipe coupling.

Other and further objects of the invention will be obvious upon an understanding of the illustrative embodiment about to be described, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is an enlarged fragmentary sectional view of the rear ferrule of the coupling and portions of the adjacent coupling members in the fully set position;

FIG. 4 is a cross-sectional view of a blank from which the preferred embodiment of the rear ferrule is formed; and FIGS. 5 through 7 are vertical sectional views illustrating three successive steps in the coining of a preferred embodiment of the rear ferrule.

Figure 1:
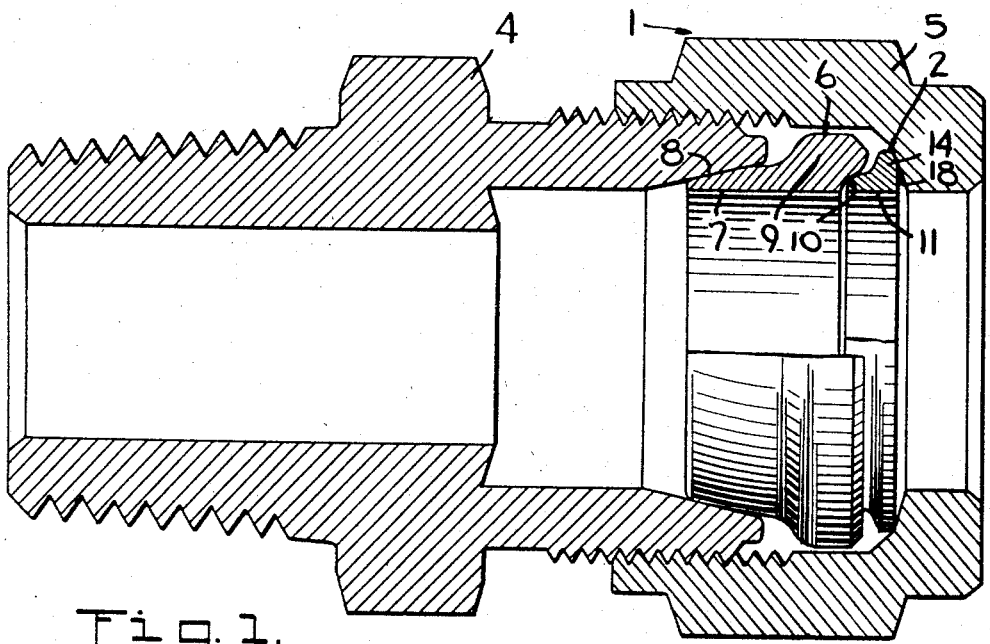
FIG. 1 is a vertical sectional view of a preferred embodiment of the coupling loosely assembled.
Figure 2:
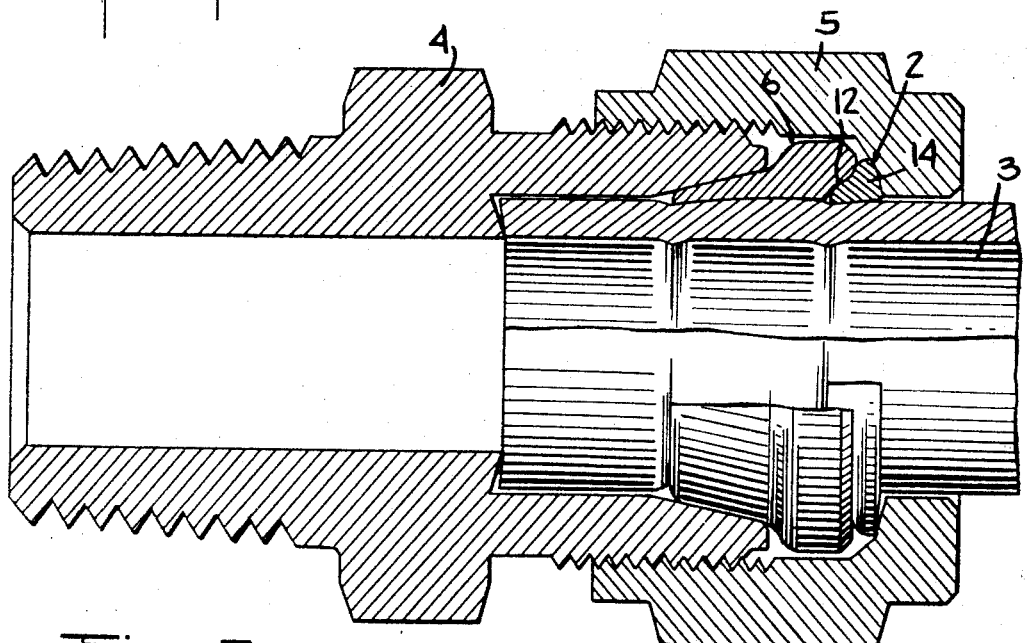
FIG. 2 is a vertical sectional view corresponding to FIG. 1 illustrating the coupling in its fully set position.

As indicated above the present invention relates to improvements in compression-type couplings. A coupling 1 is illustrated in FIGS. 1 and 2. A significant portion of the improved coupling action in this type of coupling is centered in the design and operation of the rear ferrule 2 and the present invention relates to improvements in the design, manufacture, and operation of this rear ferrule 2.

The overall coupling 1 and its operation, however, will first be briefly described to facilitate the description of the improvements of the present invention.

Compression couplings are used to connect tubes or pipes to other fittings such as valves or nipples without requiring the formation of threads in the coupled pipes. The coupling 1 herein will be described for attaching a pipe 3 to a nipple 4. The coupling 1 itself comprises three basic elements which are the coupling nut 5 and a pair of ring-like ferrules including a front 6 ferrule and the rear ferrule 2.

The front ferrule 6 is seen to have a ring-like shape with a cylindrical inner bore 7 and a forward tapered portion 8 terminating in an enlarged shoulder 9. The rear inner portion of the front ferrule comprises a generally beveled portion 10 which has a curved cross-section in a radial plan. This rear surface 10 of the front ferrule 6 comprises an annular channel with a concave or grooved shape.

The rear ferrule 2 also has a ring-like shape with a cylindrical inner bore 11 having a diameter sufficiently greater than that of the coupled pipe 3 to permit the ferrule 2 to be slipped over the pipe 3 when the ferrules 2 and 6 are assembled in the finger-tight relationship. The rear ferrule 2 has a rounded forward portion 12 which in a radially directed cross-section has an arcuate or convex shape. The rear portion of the rear ferrule 2 comprises an outwardly directed flange portion 14 whose rear surface 15 (FIG. 3) is beveled at its outer edge 16 to facilitate the initial finger-tight assembly by engaging the inclined camming surface of the nut 5. Such an improved coupling was described in my above mentioned copending application. As more fully described therein, this coupling is set by advancing the nut 5 onto the nipple 4. During this advance of the nut 5, the rear ferrule 2 is confined in front by the curved contour of the rear portion 10 of the front ferrule 6. As the advancing nut 5 applies force to the rear ferrule 2 it tends to gyrate or roll following the curved contours of the engaged portions 10 and 12 of the front and rear ferrules so that the front edge 17 of the rear ferrule 2 is moved inwardly against the pipe 3. The rear portion 14 of the rear ferrule 2 expands outwardly. As the nut 5 is tightened and the rear ferrule 2 rolls or gyrates and its forward edge 17 presses inwardly and its rear flange 14 expands outwardly, the mass of material of the rear ferrule 2 is under compression and re-shapes itself to the final form as illustrated in FIG. 3 under what may be best described as a modified fluid flow condition.

The above rolling action is significantly assisted by the contacting and curved portions 10 and 12 of the front and rear ferrules 6 and 2 respectively and in the preferred embodiment the concave portion 10 of the front ferrule has a slightly lesser curvature than does the curved forward portion 12 of the rear ferrule 2. The rolling or gyrating action is additionally assisted by an included flare or angle provided between a camming surface 18 on the nut 5 and the rear surface 15 of the rear ferrule 2. The angle may result from a beveling of one or the other or both of the nut 5 or the rear ferrule 2.

The ferrules 6 and 2 illustrated in FIGS. 1 through 3 include improved means for controlling their penetration into the pipe 3. FIG. 1, which illustrates the coupling in its finger-tight position, shows an annular space provided between the flanges 9 and 14 of the front and rear ferrules. This spacing permits the above described gyrating or rolling action of the rear ferrule 2 as the coupling is applied and set to its fully set position as illustrated in FIGS. 2 and 3. By providing the generally complimentary curved portions 20 at the rear of the front ferrule 6 and 21 at the front and rear ferrule 2 it is seen that an effective stop means is provided for controlling or limiting the penetration of the edge 17 of the rear ferrule 2 into the coupled pipe 3. The ferrules are shaped or proportioned at 20 and 21 to cause these surface to meet when the desired degree of the rear ferrule 2 tilting and penetration has been achieved.

In the above described setting operation, it is clear that the nose or edge 17 of the rear ferrule 2 which bites into the coupled pipe 3 must be relatively hard and it is also preferable that the sliding or contacting curved surfaces 10 and 12 of the ferrules be relatively hard to facilitate the rolling action. At the same time, a modified fluid flow resulting from the re-shaping of the rear ferrule during its rolling action is facilitated by a relatively softer core in the rear ferrule 2. This deposition of material hardness is provided in the improved rear ferrule 2 of the present invention by forming the ferrule 2 by a manufacturing process which will now be described.

FIGS. 4 through 7 illustrate an improved method of forming a rear ferrule such as the ferrule 2 described above characterized by a forward curved nose portion and a radially directed flange portion.

While effective rear ferrules have been made by conventional lathe or cutting techniques on the usual automatic cutting machinery and have proven satisfactory as couplings for relatively soft materials such as copper and brass, greatly improved coupling action has been found to result from the following described manufacturing process. This process provides a novel combination of hardened outer zones and soft inner areas giving an ideal combination of biting action and material flow particularly for relatively hard metals including various steels or stainless steels. The improved and preferred forming process is a coining or stamping operation, where, preferably, the shaping is restricted as closely as practical to the zones requiring a hardened surface in the coupling setting action.

A blank or ring 25 of the particular material being used such as a stainless steel is first cut from a tube as shown in FIG. 4. In a first shaping operation as illustrated in FIG. 5, the blank 25 is placed on a base or die support plate 26 and a first coining operation using a shaping or coining die 27 is performed resulting in the partial formation of a thickened flange portion 28 and in a tapering or curving forward portion 29.

In a second coining operation, the flange portion 28 is again forced radially outwardly while the forward portion of the ferrule is coined closer to its final convexly curved shape as a second coining die 30 strikes the partially shaped blank 25 as it rests on a coining base plate 31 including a beveled surface 32 to shape the outer surface of the rear flange portion 28.

Preferably a final strike or coining operation with die 33 and base 34 is provided to complete the rear ferrule and to form the desired corner radii and the exact flange 28 and convex surface 29 desired for a particular ferrule.

The above series of coining operations or strikes is typical of the process and the steps are characterized by the use of a series of dies which shape the blank by working at the critical zones described. It is clear that the exact shapes of the tools or dies and the number of strikes used may be varied within the process described as long as the principle of working or shaping the critical zones of the ferrule is maintained.

It is seen that a ferrule has been formed having the desired cross-section for the above described gyrating action and that during the formation a cold working operation has been performed with its principal effect being concentrated at the forward edge 17 of the ferrule and along the convex curved surface 29 and at the flange 28. The body of the ferrule inwardly of these zones and along the inner bore has been subjected to lesser forming stresses and thus remains relatively unhardened for providing the necessary masses of softer material for the fluid flow described above which occurs during the application of the ferrule and its re-shaping as required by the constriction of its forward portion and the expansion of its rear portion.

Not only does this coining operation provide a controlled hardening of the ferrule but it also has been found to provide a highly corrosion resistant ferrule at the critical edge and outer surface portions with respect to a wide range of fluids such as are handled by pipes coupled by such compression seals.

It will be seen that an improved pipe coupling has been provided wherein the advantages of the coupling described in my prior application referred to above have been even more fully realized. The improved shaping is especially valuable in connection with the rear ferrule of the compression coupling described.

As various changes may be made in the form, construction and arrangement of the parts herein withoutt departing from the spirit and scope of the invention and without sacrificing any of its advantages, it is to be understood that all matter herein is to be interpreted as illustrative and not in a limiting sense.

I claim:

1. A tube coupling comprising a body having a cylindrical tube receiving bore with an outwardly flared end portion, a front ring-like ferrule, said front ferrule having its front flaring outwardly at a lesser taper than the flared end portion of said bore and having its rear portion extending radially outwardly in an abruptly thickened flange portion, the front ferrule terminating at its rear end in an outwardly flaring concave surface having an arcuate shape in a longitudinal radial plane adjacent to the ferrule inner portion and a convex stop surface outwardly thereof, a rear ferrule having a cylindrical center bore for encircling and slidably engaging the tube, the forward half of the outer surface of said rear ferrule having a convexly curved portion having an arcuate shape in a longitudinal radial plane adjacent the ferrule inner portion and a concave stop surface outwardly thereof, the concave surface of the front ferrule being in sliding engagement with the convex portion of the rear ferrule and with said stop surfaces of said ferrules being initially spaced from one another, the rear half of said rear ferrule comprising a radially thickened portion, and a coupling nut threadedly engaging said body, whereby the application of torque to said coupling nut applies a rolling force to the rear ferrule causing its forward end to move inwardly against the tube and its rear portion to move outwardly with the back surface of the front ferrule flange engaging the front surface of the rear ferrule flange until said ferrule movement is terminated by the engagement of said stop surfaces with one another.

2. The ferrule as claimed in claim 1 in which the outer surface portion of said rear ferrule is relatively harder than the inner portion of the ferrule.

3. A tube coupling comprising a body having a cylindrical tube receiving bore with an outwardly flared end portion, a front ferrule having a cylindrical center bore for encircling and slidably engaging the tube, the front outer surface of said front ferrule flaring outwardly at a lesser taper than the flared end portion of said bore, the rear portion of said front ferrule having a radially outwardly extending abruptly thickened flange portion with a generally cylindrical outer surface, the center bore of the front ferrule terminating at its rear end in an outwardly flaring concave surface having an arcuate shape in a longitudinal radial plane adjacent to the ferrule inner portion and a convex stop surface outwardly thereof, a rear ferrule having a cylindrical center bore for encircling and slidably engaging the tube, the forward half of the outer surface of said rear ferrule having a convexly curved work hardened portion having an arcuate shape in a longitudinal radial plane extending from the forward edge of the center bore at least half-way back the ferrule's length and terminating in a concavely shaped stop surface rearwardly and outwardly thereof, the concave surface of the front ferrule being in sliding engagement with the convex portion of the rear ferrule, the rear half of said rear ferrule comprising a radially thickened work hardened portion about three-quarters of the maximum thickness of the flange portion of said front ferrule, a coupling nut threadedly engaging said body, and said coupling nut having a generally cylindrical inner shoulder portion spaced radially outwardly of said enlarged rear portion of said rear ferrule and permitting substantial outward movement of said rear portion until the ferrule movement is terminated by the engagement of said stop surface with one another.

4. The coupling as claimed in claim 3 in which said ferrules are made of steel.

References Cited

UNITED STATES PATENTS

| 472,959 | 4/1892 | Bernhardt | 72—471 |
| 2,171,217 | 8/1939 | Kreidel | 285—382.7 X |
| 2,397,749 | 4/1946 | Mendelson | 285—332.1 X |
| 2,484,815 | 10/1949 | Crawford | 285—382.7 X |
| 3,103,373 | 9/1963 | Lennon et al. | 285—382.7 X |
| 3,106,413 | 10/1963 | Hamlin et al. | 285—382.7 X |
| 3,120,969 | 2/1964 | Schmohl | 285—341 |
| 3,215,457 | 11/1965 | Teeters | 285—382.7 |

THOMAS F. CALLAGHAN, *Primary Examiner.*

U.S. Cl. X.R.

285—382.7